Figure 1:
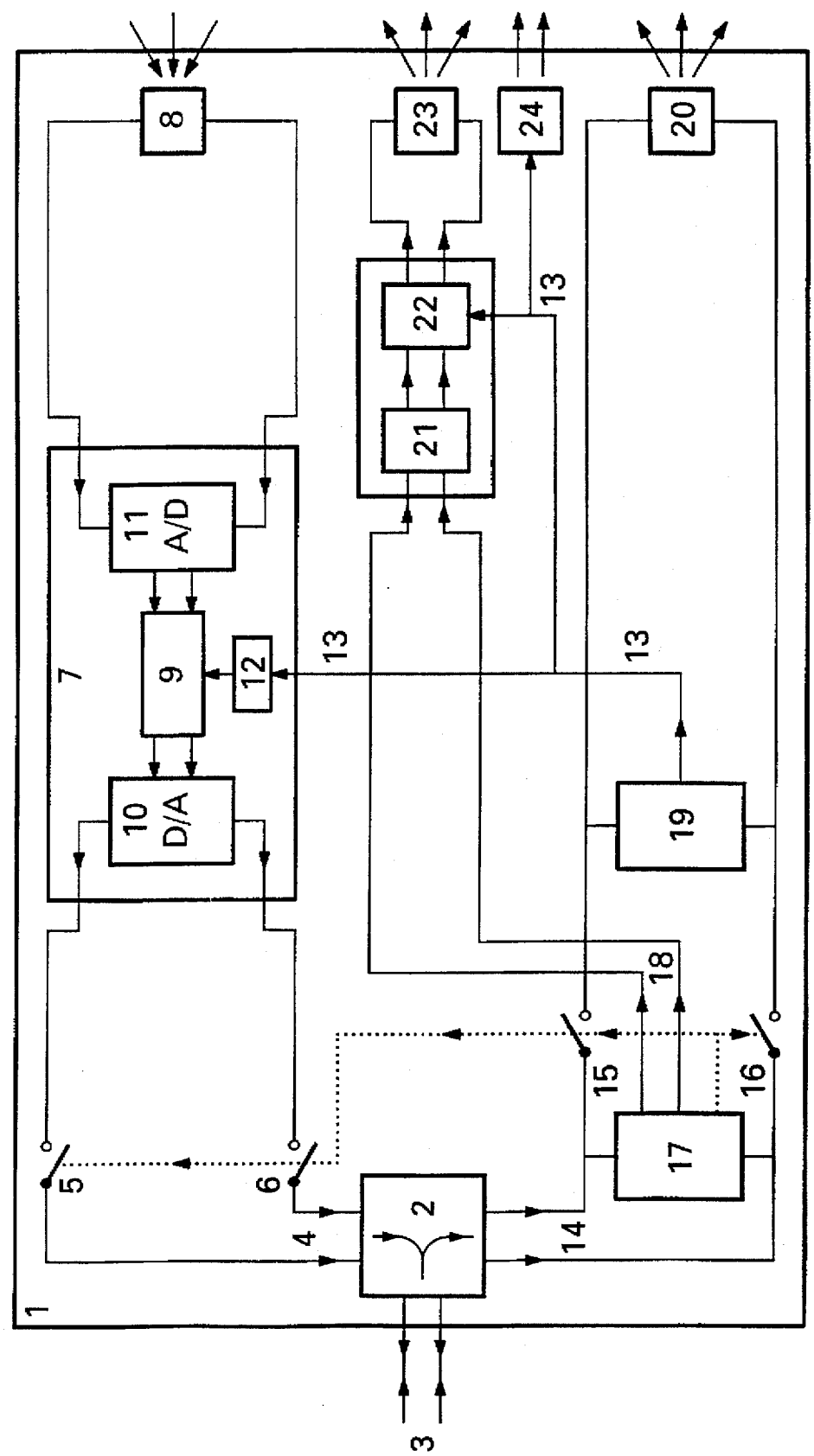

United States Patent
Koster et al.

[11] Patent Number: 5,745,162
[45] Date of Patent: Apr. 28, 1998

[54] TELECOMMUNICATION TERMINAL HAVING DELAYED ACTIVATION, AND A METHOD FOR USE THEREIN

[75] Inventors: Arian Koster, Mijdrecht; Karel Jakob Rijkse, Gouda, both of Netherlands

[73] Assignee: Koninklijke PTT Nederland N.V., Netherlands

[21] Appl. No.: 582,471

[22] Filed: Jan. 3, 1996

[30] Foreign Application Priority Data

Jan. 17, 1995 [NL] Netherlands ............ 9500082

[51] Int. Cl.$^6$ .................................................. H04N 7/12
[52] U.S. Cl. .................................... 348/16; 379/93.09
[58] Field of Search ........... 348/14–19; 379/96–99, 379/93, 110, 90, 373, 375, 376, 396, 418, 421, 93.01, 93.17, 93.26, 93.28, 93.37, 93.09

[56] References Cited

U.S. PATENT DOCUMENTS

| 4,523,311 | 6/1985 | Lee et al. ............. 370/69.1 |
|---|---|---|
| 4,821,312 | 4/1989 | Horton et al. ............. 379/97 |
| 4,827,501 | 5/1989 | Hansen ............. 379/199 |
| 5,018,186 | 5/1991 | Kimura et al. ............. 379/153 |
| 5,267,301 | 11/1993 | Nishii ............. 379/93 |

FOREIGN PATENT DOCUMENTS

| 0355838 | 2/1990 | European Pat. Off. . |
|---|---|---|
| 0374949 | 6/1990 | European Pat. Off. . |

*Primary Examiner*—Wing F. Chan
*Attorney, Agent, or Firm*—Michaelson & Wallace; Peter L. Michaelson

[57] ABSTRACT

Acoustic information which is generated via telecommunications terminals such as ordinary telephone sets may reach a videotelephone located at the other end of a telecommunications connection in an insufficiently clear degree, if at all, while the videotelephone is conducting an investigation into the kind of telecommunications terminal which is located at one end of the telecommunications connection. By providing the telecommunications terminal with a detection circuit for the detection of a first signal of a previously established type, and providing it with an activating circuit coupled to the detection circuit for generating, in response to the detected first signal of the previously established type, an activating signal for the prevention of the premature transmission of second signals, the above-mentioned possibility is strongly reduced. In this case the activating signal can, of course, activate a further circuit which without human intervention prevents the premature transmission of second signals, as well as activating a certain human action.

16 Claims, 1 Drawing Sheet

TELECOMMUNICATION TERMINAL HAVING DELAYED ACTIVATION, AND A METHOD FOR USE THEREIN

A BACKGROUND OF THE INVENTION

The invention relates to a telecommunications terminal for coupling with a telecommunications connection and provided with

- a receptor for the reception of first signals arriving via the telecommunications connection and for the conversion of these first signals into first acoustic information, and
- a transmitter for the conversion of second acoustic information into second signals and for the transmission of these second signals via the telecommunications connection.

Such a telecommunications terminal is generally known and concerns, for example, an ordinary telephone set for connection to the telecommunications connection, such as for example an ordinary telephone line. The receptor of the telephone set includes a loudspeaker for the conversion of the first signals into first acoustic information, and the transmitter of the telephone set includes a microphone for the conversion of second acoustic information into second signals. The respective reception and transmission via the telephone line of the first and second signals respectively is effected, for example, via a forked switch, which then forms part of the receptor as well as of the transmitter.

Such an ordinary telecommunications terminal which is located at one end of the telecommunications connection has the disadvantage, inter alia, that if a so-called videotelephone is located at the other end of the telecommunications connection, the videotelephone, after the establishment of the connection, will first investigate what kind of telecommunications terminal is located at the one end of the telecommunications connection. Moreover, the possibility arises that second acoustic information generated by a person via the telecommunications terminal which is located at the one end of the telecommunications connection will reach the videotelephone which is located at the other end of the telecommunications connection in an insufficiently clear degree, if at all.

B SUMMARY OF THE INVENTION

The purpose of the invention, inter alia, is to provide a telecommunications terminal of the kind mentioned in the preamble, in which the possibility is reduced of the generation by a person, via the telecommunications terminal which is located at one end of the telecommunications connection, of second acoustic information which in an insufficient degree, if at all, will reach the videotelephone which is located at the other end of the telecommunications connection.

To this end, the telecommunications terminal according to the invention has the characteristic that the receptor of the telecommunications terminal is provided with a detection circuit for the detection of a first signal of a previously established type, the telecommunications terminal being provided with an activating circuit which is connected to the detection circuit for the generation, in response to the detected first signal, of an activating signal for the prevention of second signals which are prematurely transmitted.

By providing the telecommunications terminal with the detection circuit for the detection of a first signal of a previously established type, and providing it with the activating circuit coupled to the detection circuit for the generation of an activating signal of the previously established type in response to the detected first signal for the prevention of second signals which are prematurely transmitted, a strong reduction of the previously noted possibility is achieved. In this case the activating signal can, of course, both activate a further circuit which, in the telecommunications terminal and thus without human intervention, prevents second signals from being transmitted prematurely, and activate a certain human action.

The invention is based, among others, on the insight that the investigation conducted by the videotelephone which is located at the other end of the telecommunications connection into the kind of telecommunication terminal which is located at one end of the telecommunications connection, should not coincide with the transmission by the telecommunications terminal of second signals.

Thus the problem of the coincidence of the videotelephone investigating and the telecommunications terminal transmitting second signals is resolved by preventing the premature transmission of second signals. In this case it should be observed that at least a portion of the inventiveness is formed by the posing of the problem. It should be further observed that the invention must not be restricted to telecommunications terminals for communication with videotelephones, but concerns all telecommunications terminals which can communicate with equipment which generates first signals of the previously established kind in order to investigate the kind of telecommunication terminal with which they are involved.

A first embodiment of the telecommunications terminal according to the invention has the characteristic that the telecommunications terminal is provided with a delay circuit coupled to the activating circuit for the delay of the second signals in response to the activating signal.

The second signals are delayed via the delay circuit in response to the activating signal, for example by converting the second acoustic information into digital signals via an analog-to-digital (A/D) converter, storing these digital signals and transmitting them after some time as the second signals. In this case the second signals can have an analog character as well as a digital character, a digital-to-analog (D/A) converter further being necessary in the latter case.

A second embodiment of the telecommunications terminal according to the invention has the characteristic that the transmitter of the telecommunications terminal is provided with a time interval circuit for the activation of the delay circuit in response to the activating signal during a time interval, and for the deactivation of the delay circuit after expiration of said time interval.

The delay circuit is activated during a time interval via the time interval circuit and after expiration of the time interval the delay circuit is deactivated, so that the delay of the second signals only occurs during the investigation by the videotelephone.

A third embodiment of the telecommunications terminal according to the invention has the characteristic that the first signal of the previously established type is a modem signal.

Without the delaying of the second signals during the modem signal, generated second acoustic information will reach the other side of the telecommunications connection in an insufficiently clear degree.

A fourth embodiment of the telecommunications terminal according to the invention has the characteristic that the modem signal is a videotelephone signal.

Without the delaying of the second signals during the videotelephone signal, generated second acoustic information will reach the other side of the telecommunications connection in an insufficiently clear degree.

A fifth embodiment of the telecommunications terminal according to the invention has the characteristic that the telecommunications terminal is provided with a further delay circuit, coupled to the activating circuit, for delaying, in response to the activating signal, a ringing signal which is to be generated via a generating circuit.

Via the further delay circuit, the ringing signal which is to be generated via the generating circuit is delayed, so that there is no longer any question concerning prematurely generated second acoustic information and/or prematurely generated second signals.

A sixth embodiment of the telecommunications terminal according to the invention has the characteristic that the telecommunications terminal is provided with a further generating circuit, coupled to the activating circuit, for generating an externally perceptible indication signal in response to the activating signal.

Via the further generating circuit the externally perceptible indication signal is generated, so that via the telecommunications terminal which is located at one end of the telecommunications connection a person is notified that he or she is to wait before generating second acoustic information.

The invention further concerns a method for the transmission of speech between a videotelephone and a telecommunications terminal, said method including the steps of—the transmission of first signals to the telecommunications terminal by the videotelephone, the conversion of the first signals into first acoustic information by the telecommunications terminal, the conversion of second acoustic information into second signals by the telecommunications terminal, the transmission of the second signals to the videotelephone by the telecommunications terminal.

The method according to the invention has the characteristic that said method includes the steps of the detection by the telecommunications terminal of a first signal of a previously established type, and the generation by the telecommunications terminal, in response to the detected first signal of the previously established type, of an activating signal for the prevention of prematurely transmitted second signals.

A first embodiment of the method according to the invention has the characteristic that the method includes the step of the delaying of the second signals by the telecommunications terminal in response to the activating signal.

A second embodiment of the method according to the invention has the characteristic that the method includes the step of the delaying of the second signals by the telecommunications terminal in response to the activating signal during a time interval, and of no longer delaying the second signals after expiration of said time interval.

A third embodiment of the method according to the invention has the characteristic that the method includes the step of the delaying, in response to the activating signal, of a ringing signal which is to be generated.

A third embodiment of the method according to the invention has the characteristic that the method includes the step of the generation by the telecommunications terminal, in response to the activating signal, of an externally perceptible indication signal.

U.S. Pat. No. 4,827,501 discloses a device for eliminating "junk" calls, and U.S. Pat. No. 4,523,311 discloses a device for the removal of phase jitter and frequency offset errors. Said references do not disclose a telecommunications terminal according to the invention.

C REFERENCES

U.S. Pat. No. 4,827,501
U.S. Pat. No. 4,523,311
All references are deemed to be incorporated by reference in this patent application.

D BRIEF DESCRIPTION OF THE DRAWING

The invention will be further explained on the basis of an example of embodiment shown in the Figure. In this regard:

FIG. 1 shows a telecommunications terminal for coupling to the telecommunications connection according to the invention.

E DETAILED DESCRIPTION

The telecommunications terminal 1 according to the invention, shown in FIG. 1, includes a forked switch 2 of which the in/output is connected to a two-wire telecommunications connection 3. An input of forked switch 2 is coupled to a transmitter device, which includes a device 7 and a microphone 8 coupled thereto, via a two-wire connection 4 and via switches 5 and 6 which are located serially in the respective wires of connection 4. Device 7 includes a delay circuit 9 of which an input is coupled to an output of an analog-to-digital (A/D) converter 11. An input of analog-to-digital converter 11 is connected to microphone 8 via a two-wire connection. An output of delay circuit 9 is coupled to a digital-to-analog converter (D/A) 10, of which an output is connected to the two-wire connection via the respective switches 5 and 6. A control input of delay circuit 9 is coupled to an output of time interval circuit 12, of which an input is connected to a control connection 13.

An output of forked switch 2 is coupled, via a two-wire connection 14, to a receiver device which includes a telephone circuit 17, and which includes a detection circuit 19 coupled to telephone circuit 17 via switches 15 and 16 which are located serially in the respective wires of connection 14, and which includes a loudspeaker 20 coupled to detection circuit 19. Telephone circuit 17 controls switches 5, 6, 15 and 16, and is coupled to a fixed delay circuit 21 via a two-wire connection 18, which is coupled to a variable delay circuit 22 via a two-wire connection, which is coupled to a generating circuit 23 for the generation of a ringing signal. A control input of further (here variable) delay circuit 22 and of further generating circuit 24 for the generation of an externally perceptible indication signal, such as a light signal, are connected to control connection 13, which is further coupled to a control output of detection circuit 19.

The operation of the telecommunications terminal 1 shown in FIG. 1 is as follows. A ringing signal, originating from a telephone exchange not shown in FIG. 1, which generates this signal in response to a call signal originating from a videotelephone not shown in FIG. 1, arrives via two-wire telecommunications connection 3. This ringing signal traverses forked switch 2 and reaches telephone circuit 17 via the respective wires of two-wire connection 14, the telephone circuit detecting the ringing signal and in response thereto informing the telephone exchange that it has detected the ringing signal, for example by connecting a resistor (not specifically shown) between the respective wires of two-wire connection 14, which causes a so-called line current flow. Such a telephone circuit 17 is of common knowledge and is found, for example, in a telephone answering device. Telephone circuit 17 brings switches 5, 6, 15 and 16 into the conducting state in response to the detection of the ringing signal, and supplies it with a supply voltage for the circuits 21, 22 and 23 via the two-wire connection 18. Of course the supply voltage could also be directly supplied by the telephone exchange, in which case the respective wires of two-wire connection 18 would then be connected to switches 15 and 16 respectively. Since the supply voltage reaches generating means 23 with a slight delay as a result of the presence of fixed delay circuit 21, such as for example an resistor-capacitor (RC) circuit, the ringing signal in response to the supply voltage is generated with a slight delay. The short delay time introduced in this case is necessary to give the videotelephone the opportunity of generating, in response to the telephone exchange being informed of the detection of the ringing signal by telecommunications terminal 1, a modem signal which reaches detection circuit 19 via the telephone exchange, via two-wire telecommunications connection 3, via forked switch 2 and via two-wire connection 14, and to give detection circuit 19 the opportunity of detecting the modem signal. Such a detection circuit 19 is generally known and is found, for example, in a modem. In response to detection of the modem signal detection circuit 19 generates an activating signal via the control output and control connection 13, which is applied to further delay circuit 22, such as for example an RC circuit which has been provided with an electronically adjustable resistor, to further generating circuit 24 and to time interval circuit 12, such as for example a monostable flip-flop circuit.

During a previously established time interval, time interval circuit 12 generates, in response to the activating signal, a signal which is applied to delay circuit 9. Such a delay circuit 9 is realized, for example, by a memory and a bridge lying in parallel thereto, in which during the previously established time interval digital signals originating from the A/D converter 11 are stored and are not read out, and in which after expiration of the previously established time interval the memory is read out and the bridge is switched into circuit. Due to this, digital signals originating from the A/D converter 11 (so-called digitized microphone signals) are delayed during the previously established time interval and subsequently passed on to D/A converter 10. As a result of this, the digitized microphone signals, in the case of detection of the modem signal by detection circuit 19, are delayed during the previously established time interval, after which they are converted into analog signals via D/A converter 10 and are passed to the telephone exchange and the videotelephone which is coupled to it via the respective switches 5 and 6, via two-wire connection 4, via forked switch 2 and via two-wire connection 3. Without application of the signal originating from time interval circuit 12 to delay circuit 9, the digital signals originating from the A/D converter 11 are passed on to D/A converter 12 without delay.

In response to the activating signal, further delay circuit 22 introduces an extra delay during, for example, the previously established time interval, as a result of which the ringing signal which is to be generated by generating means 23 is further delayed. In response to the activating signal, further generating means 24 generate, for example, a light signal.

Thus, in response to the activating signal, the premature transmission of microphone (audio) signals to the videotelephone is prevented in three different manners: according to the first manner by delaying these microphone signals during a previously established time interval, for example by digitizing them and delaying the digital signals obtained in this way in a digital manner, in which it is made impossible for a person who is reacting via telecommunications terminal 1 to react too quickly with his voice, according to the second manner by delaying the ringing signal further, in which the person who is reacting via telecommunications terminal 1 is not prompted to react until the right moment has arrived (after detection of the modem signal), and according to the third manner by generating a light signal, in which the person who is reacting via telecommunications terminal 1 is optically notified that he is to wait for some time before generating a vocal sound.

Of course it is not absolutely necessary that all three manners are applied simultaneously. In principle it will suffice, for example, to provide telecommunications terminal 1 with either further circuit 22, a device 7 or further generating means 24. In particular, further generating means 24, in combination with one of the remaining possibilities, will preferably be applied. The videotelephone modem signal is only one of the many possible first signals of the previously established type. In a more digital environment, for example, the first signal of the previously established type could also be a certain code.

Not shown in FIG. 1 is a reset circuit which is known to those skilled in the art, which in response to the person reacting to the ringing signal of telecommunications terminal 1 switches off the ringing signal via, for example, the lifting of the telephone receiver piece. Such a reset circuit is, for example, fitted in telephone circuit 17 and/or generating means 23. Further, the manner of providing power to further generating means 24 is not shown in FIG. 1. This could be realized, for example, by connecting further generating means 24 to the respective switches 15 and 16. Device 17 could possibly be replaced by an analog device which then delays the analog signals originating from microphone 8 in an analog manner during the previously established time interval.

Among others, the invention therefore relates to a telecommunications terminal 1 for coupling to a telecommunications terminal 3 and provided with a receptor 14, 15, 16, 17 and 20 for the reception of first signals arriving via the telecommunications connection and for the conversion of these first signals into first acoustic information via loudspeaker 20, and a transmitter 4, 5, 6 and 8 for the conversion of second acoustic information into second signals via microphone 8 and for the transmission of these second signals via the telecommunications connection, the telecommunications terminal having the characteristic that the receptor of the telecommunications terminal is provided with a detection circuit 19 for the detection of a first signal of a previously established type, in which the telecommunications terminal is provided with an activating circuit 13 which is coupled to the detection circuit for generating, in response to the detected first signal of the previously established type, an activating signal for the prevention of the transmission of prematurely transmitted second signals.

A first embodiment of the telecommunications terminal according to the invention has the characteristic that the telecommunications terminal is provided with a device 7 which is coupled to the activating circuit for the delay of the second signals in response to the activating signal.

A second embodiment of the telecommunications terminal according to the invention has the characteristic that the transmitter of the telecommunications terminal is provided with a time interval circuit 12 for the activation, in response to the activating signal, of the device, specifically its delay, during a time interval and for the deactivation of the device, again its delay, after the expiration of this time interval.

A third embodiment of the telecommunications terminal according to the invention has the characteristic that the first signal of the previously established type is a modem signal.

A fourth embodiment of the telecommunications terminal according to the invention has the characteristic that the modem signal is a videotelephone modem signal.

A fifth embodiment of the telecommunications terminal according to the invention has the characteristic that the telecommunications terminal is provided with further delay circuit 22, which is coupled to the activating circuit, for delaying, in response to the activating signal, a ringing signal which is to be generated via a generating circuit 23.

A sixth embodiment of the telecommunications terminal according to the invention has the characteristic that the telecommunications terminal is provided with further generating circuit 24, which is coupled to the activating circuit, for generating, in response to the activating signal, an externally perceptible indication signal.

We claim:

1. A telecommunications terminal comprising:

a receptor comprising a sound producing circuit for receiving first signals from a telecommunications line and transforming said first signals into sound;

a transmitter comprising a microphone circuit for transmitting second signals to the telecommunications line in response to sound;

a ringing circuit comprising a ringing generator for generating ringing sound in response to a ringing signal; and wherein said receptor further comprises a detection circuit for detecting a videotelephone signal appearing on the telecommunications line and for generating an activating signal upon detection of the videotelephone signal, said activating signal serving to prevent premature transmission of the second signals, and the terminal further comprises a 2. A telecommunications terminal comprising:

a receptor, having a loudspeaker circuit, for receiving first signals from a telecommunications line and for transforming said first signals into sound;

a transmitter comprising a microphone circuit for transmitting second signals to the telecommunications line in response to sound;

a ringing circuit comprising a ringing generator for generating a ringing sound in response to a ringing signal; and wherein said receptor further comprises a detection circuit for detecting a videotelephone signal appearing on the telecommunications line and for generating an activating signal upon detection of the videotelephone signal, said activating signal serving to prevent premature transmission of the second signals, and said transmitter comprises a delay element, operatively connected with the detection circuit, so as to delay the second signals, in response to the activating signal, from being simultaneously transmitted to the videotelephone.

3. The telecommunications terminal of claim 2, further comprising a time interval circuit, connected between the detection circuit and the delay element, for activating the delay element in response to the activating signal and deactivating the delay element after a predetermined delay has occurred.

4. The telecommunications terminal of claim 2, further comprising an analog/digital converter arranged at a receiving end of the delay element, and a digital/analog converter arranged at a transmitting end of the delay element, the delay element digitally imparts a delay to a signal applied to the receiving end.

5. The telecommunications terminal of claim 2, further comprising a generating circuit, operatively connected with the detection circuit, for generating an externally perceptible indication signal in response to the activating signal.

6. A method of communicating with a videotelephone over a telecommunications connection using a telecommunications terminal, the method comprising the steps of:

establishing, through the videotelephone, a connection with the terminal;

transmitting a videotelephone signal from the videotelephone;

detecting, in the terminal, the videotelephone signal and producing, in response thereto, an activating signal, said activating signal serving to prevent premature transmission of the second signals; and delaying, in the terminal and in response to the activating signal, a ringing signal received by the terminal.

7. The method of claim 6, further comprising the step of producing, in the terminal, an externally perceptible indication signal in response to the activating signal.

8. A method of communicating with a videotelephone, over a telecommunications connection, using a telecommunications terminal, the method comprising the steps of:

establishing, through the videotelephone, a connection with the terminal;

transmitting a videotelephone signal from the videotelephone;

detecting, in the terminal, the videotelephone signal and producing, in response thereto, an activating signal, said activating signal serving to prevent premature transmission of the second signals; and generating an externally perceptible indication signal in response to the activating signal.

9. A method of communicating with a videotelephone, over a telecommunications connection, using a telecommunications terminal, the method comprising the steps of:

establishing, through the videotelephone, a connection with the terminal;

transmitting a videotelephone signal from the videotelephone;

detecting, in the terminal, the videotelephone signal and producing, in response thereto, an activating signal, said activating signal serving to prevent premature transmission of the second signals; and delaying, in the terminal and in response to the activating signal, an audio signal produced by the terminal, in response to sound reaching a microphone, from being simultaneously transmitted to the videotelephone.

10. The method of claim 9, wherein the delaying of the audio signal occurs during a predetermined time interval.

11. The method of claim 9, further comprising the step of producing, in the terminal, an externally perceptible indication signal in response to the activating signal.

12. A telecommunications terminal comprising:

a receptor, comprising a sound producing circuit, for receiving first signals from a telecommunications line and transforming said first signals into sound;

a transmitter, comprising a microphone circuit, for transmitting second signals to the telecommunications line in response to sound;

a ringing circuit, comprising a ringing generator, for generating ringing sound in response to a ringing signal; and wherein said receptor further comprises a detection circuit for detecting a videotelephone signal appearing on the telecommunications line and for generating an activating signal upon detection of the videotelephone signal, said activating signal serving to prevent premature transmission of the second signals, and said ringing circuit further comprises a variable delay element operatively connected with the detection circuit so as to delay the ringing signal in response to the activating signal.

13. The telecommunications terminal of claim 12, further comprising a generating circuit, operatively connected with the detection circuit, for generating an externally perceptible indication signal in response to the activating signal.

14. The telecommunications terminal of claim 12, wherein the ringing circuit further comprises a fixed delay element so as to further delay the ringing signal independently of the activating signal. the activiating signal.

15. The telecommunications terminal of claim 12, said transmitter comprises a fixed delay element operatively connected with the detection circuit so as to delay the second signals in response to the activating signal.

16. The telecommunications terminal of claim 15 wherein the transmitter further comprises a time interval circuit connected between the detection circuit and the delay element for activating the fixed delay element in response to the activating signal and deactivating the delay element after a predetermined delay interval has occurred.

* * * * *